Sept. 12, 1933.  M. T. RUDDY  1,926,179
RAPPING PLATE
Filed June 1, 1932
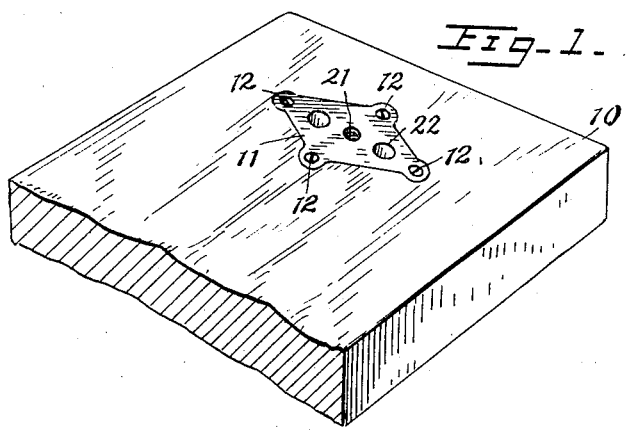
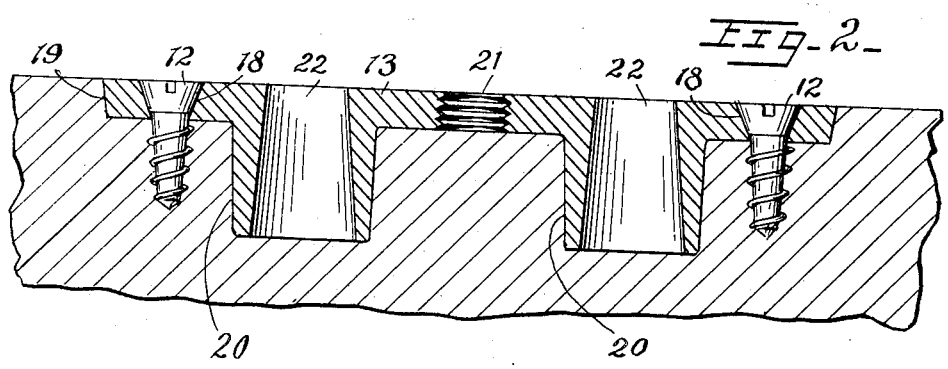
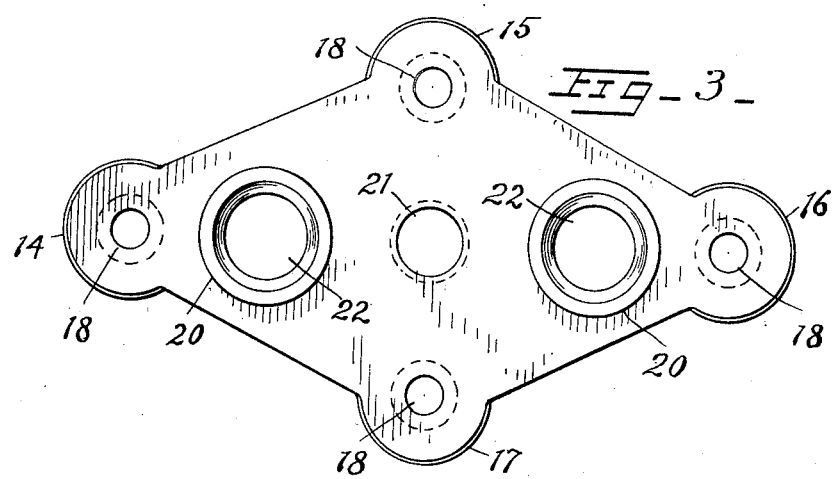
Inventor
MARTIN T. RUDDY Patented Sept. 12, 1933

1,926,179

UNITED STATES PATENT OFFICE 1,926,179

RAPPING PLATE

Martin T. Ruddy, Lakewood, Ohio

Application June 1, 1932. Serial No. 614,746

1 Claim. (Cl. 22—186)

This invention relates to rapping plates for attachment to molding patterns and the like, and has for one of its objects the provision of a device of this kind that may be so substantially and firmly secured to the pattern that it will withstand the severe service to which it is ordinarily subjected.

A further object of the invention is to provide a very simple device of this kind that will be inexpensive to manufacture on account of requiring a minimum of machine work.

Other objects of the invention and the features of novelty will be apparent from the following description, taken in connection with the accompanying drawing, of which Figure 1 is a perspective view of a diagrammatic representation of a pattern, with a rapping plate, embodying my invention, positioned thereon;

Fig. 2 is a longitudinal section through the rapping plate illustrated in Fig. 1; and Fig. 3 is a bottom plan view thereof.

Referring to the drawing, 10 indicates a pattern, such as is commonly made of wood or other material, and 11 indicates the rapping plate, which is attached to the pattern by means of screws 12.

The rapping plate may be made in various sizes and shapes, to suit different patterns but, as illustrated, consists of a substantially diamond-shaped plate 13 having ears 14, 15, 16 and 17 at the corners, these ears preferably having a circular periphery, as will be best seen from Fig. 3. Tapered holes 18 are provided in each of said ears to receive the attaching screws 12. The periphery of the plate is beveled, as indicated at 19, in order that it may be wedged into the recess, formed in the pattern, to receive the plate. On the underside of the plate 13, there are hollow, substantially cylindrical bosses 20, which tightly fit in suitable openings in the pattern. The bores of the bosses 20 extend through to the upper side of the plate 13 and are adapted to receive a rod or other device by which the molder may rap or jar the pattern to loosen it in the same. In the drawings, I have illustrated two of the bosses 20 but it will be understood that one or more of such bosses may be used, depending upon the requirements.

The radii of the bosses 20 are preferably the same as the radii of the peripheries of the ears 14, 15, 16 and 17 so that, in attaching the rapping plate to a pattern, the recesses for the bosses and the ears may be made with the same boring tool.

A central threaded opening 21 is provided in the plate 13 for attaching a screw eye or hook for use in lifting the pattern.

By providing a slight draft or taper on the exterior of the bosses 20, the rapping plate may be easily molded and the openings 18, as well as the openings 22 in the bosses, may be made by means of cores in the mold so that the only machining operation on the rapping plate is the threaded opening 21. This insures that the manufacturing cost of the rapping plate will be very low. Any suitable material, such as cast iron, aluminum, or other metal may be used.

The operation of applying the rapping plate to a pattern is comparatively simple. The plate may be laid upon the pattern, in an inverted position, and the outline for the opening may be marked out. The centers of the ears and of the bosses may thus be accurately located and suitable hollows bored in the pattern to receive the ears and the bosses. The recess for the plate 13 may then be chiseled out and the rapping plate may then be driven into the pattern so that it will be located as shown in Fig. 2, with the top of the rapping plate flush with the surface of the pattern. The screws 12 may then be inserted and the rapping plate will be ready for use.

While I have illustrated and described what I now consider to be the preferred form of my invention, it will be understood that changes in the shape and arrangement of the parts may be made without departing from the spirit of the invention as defined in the appended claim.

Having thus described my invention, what I claim is:

As a new article of manufacture, a rapping plate for patterns and the like consisting of a plate provided with a plurality of substantially cylindrical hollow bosses on one side thereof, the openings in said bosses being tapered and extending through said plate to the opposite side thereof, said plate being provided with a plurality of ears at the periphery thereof having circular edges of the same radius of curvature as the outer surfaces of said bosses, and said plate also having a threaded opening between said bosses and openings at the centers of said ears to receive fastening screws.

MARTIN T. RUDDY.